United States Patent
Kim et al.

(10) Patent No.: US 8,633,918 B2
(45) Date of Patent: Jan. 21, 2014

(54) METHOD OF DETECTING TOUCH POSITION, TOUCH POSITION DETECTING APPARATUS FOR PERFORMING THE METHOD AND DISPLAY APPARATUS HAVING THE TOUCH POSITION DETECTING APPARATUS

(75) Inventors: Jin-Hwan Kim, Suwon-si (KR);
Hyun-Min Cho, Seoul (KR);
Guk-Hyun Kim, Yongin-si (KR);
Jong-Hee Kim, Hwaseong-si (KR);
Hyun-Jin Cho, Seoul (KR)

(73) Assignee: Samsung Display Co., Ltd, Yongin, Gyeonggi-Do (KR)

( * ) Notice: Subject to any disclaimer, the term of this patent is extended or adjusted under 35 U.S.C. 154(b) by 509 days.

(21) Appl. No.: 12/971,251

(22) Filed: Dec. 17, 2010

(65) Prior Publication Data
US 2011/0221997 A1    Sep. 15, 2011

(30) Foreign Application Priority Data
Mar. 9, 2010 (KR) .............................. 2010-0020665

(51) Int. Cl.
*G06F 3/042* (2006.01)
(52) U.S. Cl.
USPC .......... 345/176; 345/173; 345/175; 178/18.01
(58) Field of Classification Search
USPC ................. 345/173–179; 359/487, 529, 652; 178/18.01–18.04
See application file for complete search history.

(56) References Cited

U.S. PATENT DOCUMENTS

| | | | |
|---|---|---|---|
| 8,149,221 B2 * | 4/2012 | Newton | 345/173 |
| 2005/0128190 A1 * | 6/2005 | Ryynanen | 345/173 |
| 2006/0279558 A1 | 12/2006 | Van Delden et al. | |
| 2007/0084989 A1 | 4/2007 | Lange et al. | |
| 2008/0179507 A2 | 7/2008 | Han | |
| 2012/0098794 A1 * | 4/2012 | Kleinert et al. | 345/175 |

FOREIGN PATENT DOCUMENTS

KR    10-2009-0051613    5/2009

OTHER PUBLICATIONS

English Abstract for Publication No. 10-2009-0051613.

* cited by examiner

*Primary Examiner* — Kimnhung Nguyen
(74) *Attorney, Agent, or Firm* — F. Chau & Associates, LLC

(57) ABSTRACT

A light waveguide has a rectangular plate shape and is configured to totally reflect internal light arriving at an angle greater than a critical angle. Light emitting parts are disposed at corners of the light waveguide. Each of the light emitting parts emits light once in a period. A first light receiving part is disposed along a first side surface of the light waveguide, and receives light emitted from the light emitting parts adjacent to a second side surface facing the first side surface of the light waveguide. The second light receiving part is disposed along the second side surface of the light waveguide, and receives light emitted from the light emitting parts adjacent to the first side surface. A detecting part detects a touch position based on an amount of the light received by the first and second light receiving parts.

20 Claims, 17 Drawing Sheets

METHOD OF DETECTING TOUCH POSITION, TOUCH POSITION DETECTING APPARATUS FOR PERFORMING THE METHOD AND DISPLAY APPARATUS HAVING THE TOUCH POSITION DETECTING APPARATUS

CROSS REFERENCE TO RELATED APPLICATIONS

This application claims priority under 35 U.S.C. §119 to Korean Patent Application No. 10-2010-0020665, filed on Mar. 9, 2010 in the Korean Intellectual Property Office (KIPO), the contents of which are herein incorporated by reference in their entirety.

BACKGROUND OF THE INVENTION

1. Technical Field

Exemplary embodiments of the present invention relate to detecting a touch position, and more particularly, exemplary embodiments of the present invention relate to a method of detecting touch positions, a touch position detecting apparatus for performing the method and a display apparatus having the touch position detecting apparatus.

2. Discussion of the Related Art

A touch panel is an example of input devices which serve as an interface between an information communication apparatus having a display and a user. The user touches the touch panel with a finger or a stylus and the information communication apparatus may then interpret the touches as input.

A touch panel may serve as an intuitive way for people of all ages to interact with a computerized device. Thus, touch panels are commonly used in cellular phones, personal digital assistants (PDAs), informational kiosks and automated teller machines (ATMs), for example, as may be found in a bank, a public office, a medical center and a tourist center, a direction board, etc. Touch panels may be incorporated into flat panel displays such as a liquid crystal display (LCD) apparatus or conventional display devices such as those having a cathode ray tube (CRT).

The touch panel may be classified as a resistive/pressure sensitive type touch panel, a capacitive/electrostatic type touch panel, an infrared type touch panel and so on.

For example, the infrared type touch panel uses characteristics of light to determine when a touch is present. In the infrared type touch panel, infrared light is blocked by an obstacle disposed on a surface of the touch panel so that a touch position may be detected. In the infrared type touch panel, beams of infrared light propagating in a horizontal direction and in a vertical direction are respectively blocked so that the touch position is detected by reading x and y coordinates of a position at which the infrared light is blocked.

A first side of the infrared type touch panel includes infrared light sources that radiate infrared light and a second side of the infrared type touch panel includes a set of infrared light sensors that detect the infrared light. Accordingly, an infrared grid is established on the surface of the touch panel.

However, in conventional infrared type touch panels, even though a number of infrared light sources may be used, the panel may be limited to only sensing one touch position at a time. Accordingly, when two positions are touched on the infrared type touch panel at the same time, the infrared type touch panel may not distinguish two positions, the infrared type touch panel may detect only the previously touched position, or a ghost touch position is detected and a touch error may occur.

SUMMARY OF THE INVENTION

Exemplary embodiments of the present invention provide a method of detecting a plurality of touch positions using a reduced number of light sources.

Exemplary embodiments of the present invention also provide a touch position detecting apparatus for performing the above-mentioned method.

Exemplary embodiments of the present invention also provide a display apparatus having the touch position detecting apparatus.

According to an exemplary embodiment of the present invention, there is provided a method of detecting a plurality of touch positions. In the method, light emitting parts are respectively disposed at corners of a light waveguide having a rectangular plate shape, and emit light once in a period from each of the light emitting parts. Light receiving parts disposed along first and second side surfaces of the light waveguide receive light according to a touch on the light waveguide. The second side surface faces the first side surface. The touch position is detected based on an amount of the light received in the light receiving parts.

In an exemplary embodiment, the light receiving part disposed along the first side surface of the light waveguide may receive the light emitted from the light emitting parts adjacent to the second side surface of the light waveguide, and the light receiving part disposed along the second side surface of the light waveguide may receive the light emitted from the light emitting parts adjacent to the first side surface of the light waveguide, when the light is received according to the touch on the light waveguide.

In an exemplary embodiment, the light emitting parts may be sequentially driven.

In an exemplary embodiment, when the touch position is detected, 2N coordinates may be obtained from the amount of the received light, using a coordinate system having an axis substantially parallel with a longitudinal side of the first side surface of the light waveguide and an axis substantially parallel with a longitudinal side of a third side surface of the light waveguide. Then, the 2N coordinates may be calculated to detect N touch positions. In this case, the third side surface may be substantially perpendicular to the first side surface, and N may be a positive integer.

In an exemplary embodiment, when the touch position is detected, the touch position may be detected using a position which is symmetric to the touch position with respect to a center of the light waveguide.

In an exemplary embodiment, coordinates having the smallest amount of the received light in each light receiving range may be obtained when the 2N coordinates are obtained from the amount of the received light.

In an exemplary embodiment, when the touch position is detected, the 2N coordinates may be matched based on light modulating intensity widths respectively corresponding to the 2N coordinates when N is greater than or equal to 2.

In an exemplary embodiment, when the 2N coordinates are matched, the light modulating intensity widths respectively corresponding to the 2N coordinates may be converted into digital values. The 2N coordinates may be arranged according to light receiving time of the light receiving parts and sizes of the light modulating intensity widths which are converted into the digital values. The arranged 2N coordinates may be cross-matched to output N coordinates.

According to an exemplary embodiment of the present invention, a display touch position detecting apparatus includes a light waveguide, light emitting parts, a first light receiving part, a second light receiving part and a detecting part. The light waveguide has a rectangular plate shape and totally reflects incident light. The light emitting parts are respectively disposed at corners of the light waveguide. Each of the light emitting parts emits light once in a period. The first light receiving part is disposed along a first side surface of the light waveguide and receives light emitted from the light emitting parts adjacent to a second side surface of the light waveguide according to a touch on the light waveguide. The second side surface faces the first side surface. The second light receiving part is disposed along the second side surface of the light waveguide and receives light emitted from the light emitting parts adjacent to the first side surface of the light waveguide according to the touch on the light waveguide. The detecting part detects a touch position based on an amount of the light received by the first and second light receiving parts.

In an exemplary embodiment, the light emitting parts may be sequentially driven.

In an exemplary embodiment, the detecting part may include an obtaining part and a calculating part. The obtaining part may obtain 2N coordinates from the amount of the received light, using a coordinate system having an axis substantially parallel with a longitudinal side of the first side surface of the light waveguide and an axis substantially parallel with a longitudinal side of a third side surface of the light waveguide. The third side surface may be substantially perpendicular to the first side surface. The calculating part may calculate the 2N coordinates to detect N touch positions. In this case, N is a positive integer.

In an exemplary embodiment, each of the 2N coordinates may be coordinates having the smallest amount of the received light in each light receiving range.

In an exemplary embodiment, the detecting part may further include a matching part matching the 2N coordinates based on light modulating intensity widths respectively corresponding to the 2N coordinates when N is greater than or equal to 2.

In an exemplary embodiment, the matching part may include a converting part, an arranging part and an outputting part. The converting part may convert the light modulating intensity widths respectively corresponding to the 2N coordinates into digital values. The arranging part may arrange the 2N coordinates according to a light receiving time of the light receiving parts and sizes of the light modulating intensity widths which are converted into the digital values. The outputting part may cross-match the arranged 2N coordinates to output N coordinates.

In an exemplary embodiment, the corners of the light waveguide may be chamfered to create the light emitting parts.

In an exemplary embodiment, each of the light emitting parts may include an infrared light emitting diode (LED).

According to an exemplary embodiment of the present invention, a display apparatus includes a light waveguide, light emitting parts, a first light receiving part, a second light receiving part, a detecting part, a thin-film transistor (TFT) substrate and a liquid crystal layer. The light waveguide has a rectangular plate shape and totally reflects incident light. The light emitting parts are respectively disposed at corners of the light waveguide. Each of the light emitting parts emits light once in a period. The first light receiving part is disposed along a first side surface of the light waveguide and receives light emitted from the light emitting parts adjacent to a second side surface of the light waveguide according to a touch on the light waveguide. The second side surface faces the first side surface. The second light receiving part is disposed along the second side surface of the light waveguide, and receives light emitted from the light emitting parts adjacent to the first side surface of the light waveguide according to the touch on the light waveguide. The detecting part detects a touch position based on an amount of the light received by the first and second light receiving parts. The TFT substrate is disposed under the light waveguide to receive an image signal according to the touch position. The liquid crystal layer is formed between the light waveguide and the TFT substrate.

In an exemplary embodiment, the corners of the light waveguide may be chamfered to create the light emitting parts.

In an exemplary embodiment, the display apparatus may further include a color filter disposed over the TFT substrate, a low refraction layer disposed between the liquid crystal layer and a first surface of the light waveguide, and a polarizing plate disposed on a second surface of the light waveguide facing the first substrate.

In an exemplary embodiment, the display apparatus may further include a color filter substrate disposed between the light waveguide and the liquid crystal layer and a polarizing plat disposed between the light waveguide and the color filter substrate.

According to an exemplary embodiment of the present invention, the number of the light sources may decrease so that manufacturing cost may decrease. In addition, multi-touch positions may be detected accurately.

BRIEF DESCRIPTION OF THE DRAWINGS

The above and other features and aspects of exemplary embodiments of the present invention will become more apparent by describing them in detailed with reference to the accompanying drawings, in which.

DETAILED DESCRIPTION OF EXEMPLARY EMBODIMENTS

Figure 1:
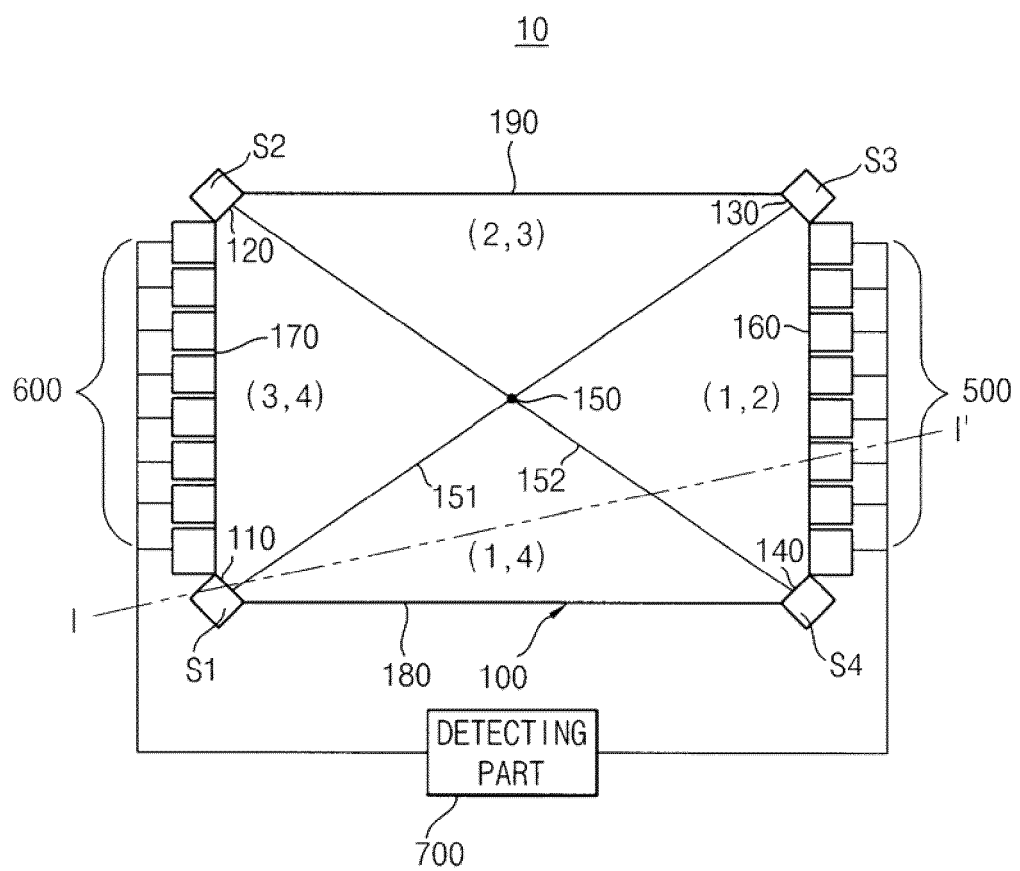
FIG. 1 is a plan view illustrating a touch position detecting apparatus according to an exemplary embodiment of the present invention.

Exemplary embodiments of the present invention are described more fully hereinafter with reference to the accompanying drawings. The present invention may, however, be embodied in many different forms and should not be construed as limited to the exemplary embodiments set forth herein. Rather, these exemplary embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals may refer to like elements throughout.

Hereinafter, exemplary embodiments of the present invention will be explained in detail with reference to the accompanying drawings.

Figure 2A:
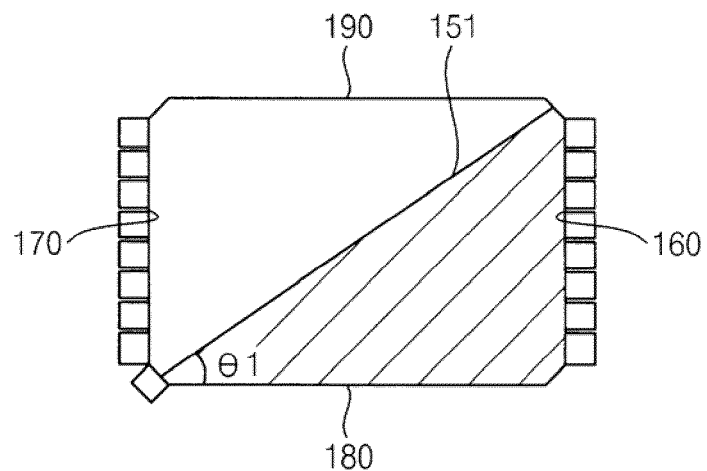
FIGS. 2A to 2D are conceptual diagrams illustrating the touch position detecting apparatus in FIG. 1.
Figure 2B:
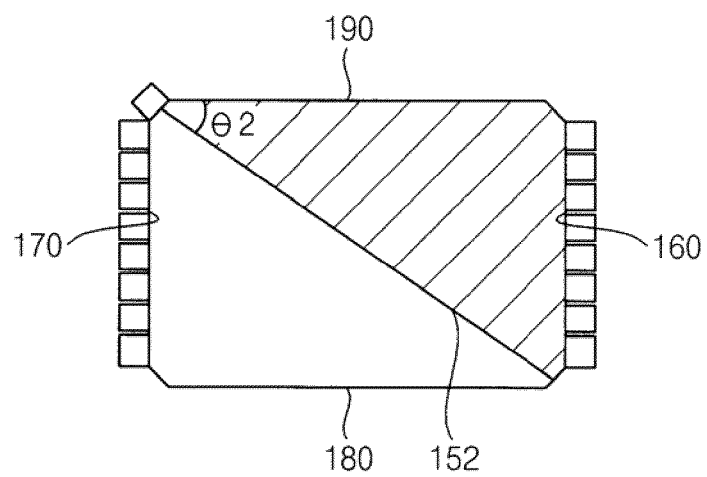
Figure 2C:
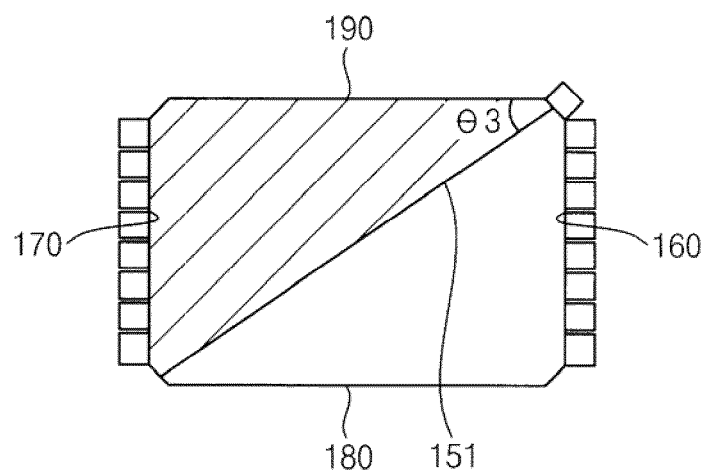
Figure 2D:
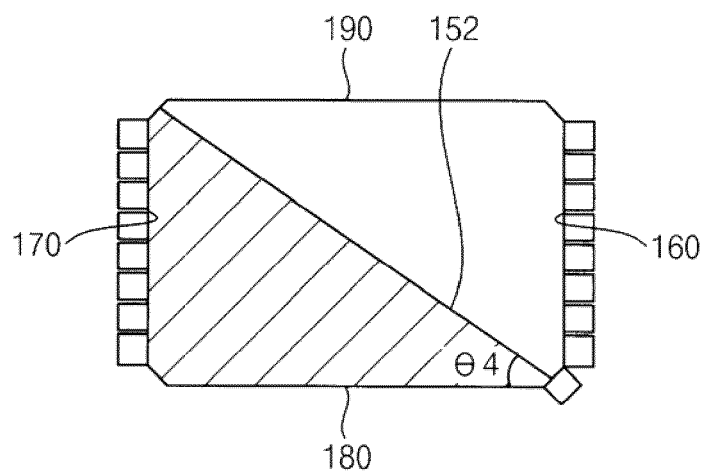
Figure 3:
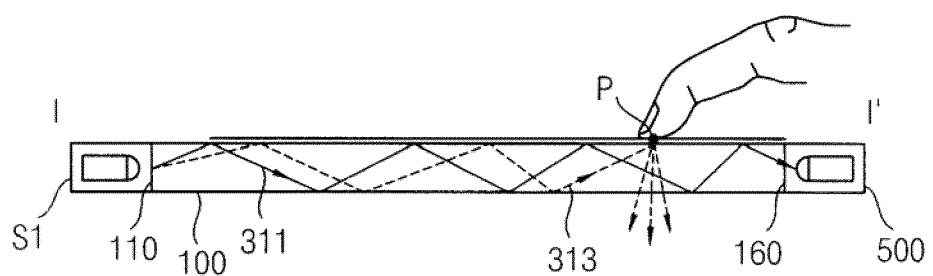
FIG. 3 is a cross-sectional view taken along a line I-I' in FIG. 1.
Figure 4:
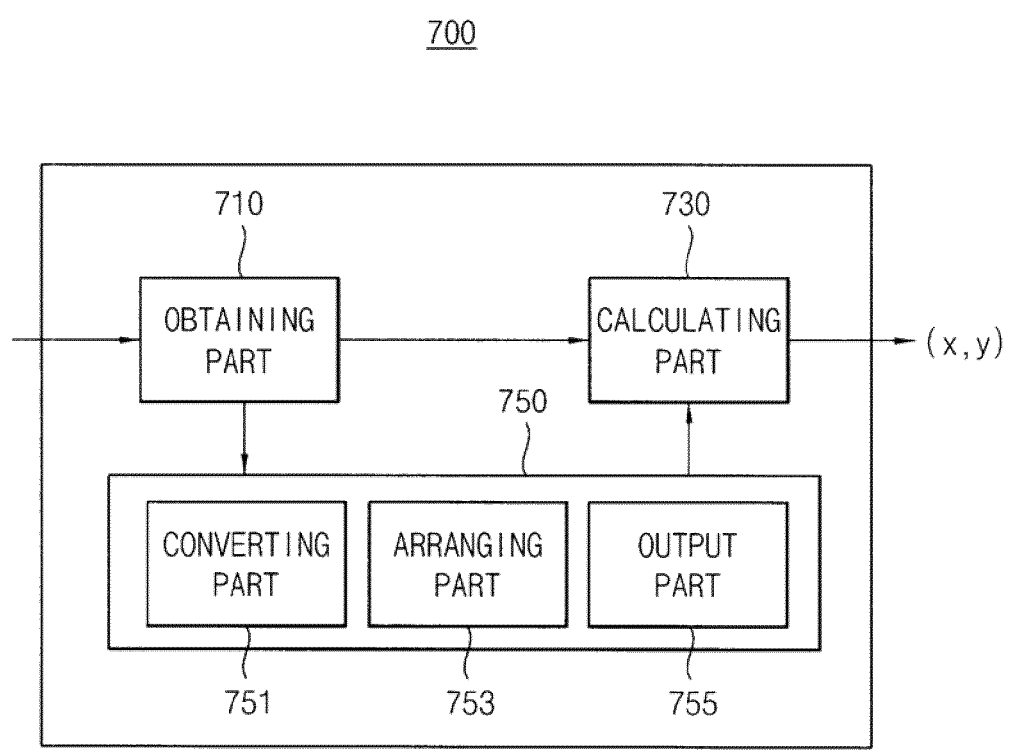
FIG. 4 is a block diagram illustrating a detecting part in FIG. 1.

FIG. 1 is a plan view illustrating a touch position detecting apparatus 10 according to an exemplary embodiment of the present invention. FIGS. 2A to 2D are conceptual diagrams illustrating the touch position detecting apparatus 10 in FIG. 1. FIG. 3 is a cross-sectional view taken along a line I-I' in FIG. 1. FIG. 4 is a block diagram illustrating a detecting part 700 in FIG. 1.

The touch position detecting apparatus 10 uses a frustrated total internal reflection (FTIR). The FTIR is an optical phenomenon which occurs when light is incident from an optically dense medium to a less optically dense medium, in other words, light is incident from a medium having a higher refractive index to a medium with having a lower refractive index and an incident angle is larger than a critical angle with respect to a perpendicular direction of a boundary surface between the two media.

Referring to FIGS. 1 to 3, the touch position detecting apparatus 10 includes a light waveguide 100, light emitting parts S1, S2, S3 and S4, a first light receiving part 500, a second light receiving part 600 and a detecting part 700.

The light waveguide 100 has a rectangular parallelepiped shape, and includes a first side surface 160, a second side surface 170, a third side surface 180 and a fourth side surface 190. The first side surface 160 and the second side surface 170 face each other, the third side surface 180 and the fourth side surface 190 face each other, and the third side surface 180 connects the first and second side surfaces 160 and 170. The third side surface 180 and the fourth side surface 190 are substantially perpendicular to the first side surface 160 and the second side surface 170, respectively.

According to an exemplary embodiment, an upper surface and a lower surface of the light waveguide 100 may have rectangular shapes having lateral sides which are longitudinal sides of first and second side surfaces 160 and 170 or longitudinal sides which are longitudinal sides of first and second side surfaces 160 and 170. In addition, the upper surface and the lower surface of the light waveguide 100 may have square shapes having four sides which are substantially the same and are longitudinal sides of the first and third side surfaces 160 and 180.

The light waveguide 100 totally reflects light incident from the light emitting parts S1, S2, S3 and S4 respectively disposed at corners 110, 120, 130 and 140 inside of the light waveguide 100. The total reflection in the light waveguide 100 may be frustrated when contact is made by an external obstacle. The external obstacle may include a pointing device such as a finger or a touch pen.

For example, the light waveguide 100 may include an acrylic resin such as polymethylmethacrylate (PMMA) or a heat-resisting glass material such as white glass.

The light emitting parts S1, S2, S3 and S4 emit light at the corners 110, 120, 130 and 140. The light emitted from the light emitting parts S1, S2, S3 and S4 is incident to the light waveguide 100. The corners 110, 120, 130 and 140 of the light waveguide 100 may be chamfered according to shapes of the light emitting parts S1, S2, S3 and S4, so that the light emitting parts S1, S2, S3 and S4 may be disposed at the corners 110, 120, 130 and 140 of the light waveguide 100. Each of the light emitting parts S1, S2, S3 and S4 may include an infrared light emitting diode (LED).

Each of the light emitting parts S1, S2, S3 and S4 emits light once in a period. For example, the light emitting parts S1, S2, S3 and S4 do not emit light at the same time. Each of the light emitting parts S1, S2, S3 and S4 emits light with a time difference or continuously emits light. The period is defined as a time in which all of the light emitting parts S1, S2, S3 and S4 emit light once. The light emitting parts S1, S2, S3 and S4 may emit light sequentially or randomly. In addition, the light emitting parts S1, S2, S3 and S4 may emit light clockwise or counterclockwise.

A plurality of light receiving elements of the first light receiving part 500 is arranged in a line beside the first side surface 160. The light receiving elements may include a photodetector such as a photodiode or phototransistor.

The first light receiving part 500 receives light emitted from the light emitting parts S1 and S2 adjacent to the second side surface 170. Thus, a diffusion angle θ1 of the light emitting part S1 may be defined as a tangent (a length of a longitudinal side of the first side surface 160/a length of a longitudinal side of the third side surface 180) with respect to the third side surface 180, as shown in FIG. 2A. A diffusion angle θ2 of the light emitting part S2 may be defined as a tangent (a length of the longitudinal side of the first side surface 160/a length of a longitudinal side of the fourth side surface 190) with respect to the fourth side surface 190, as shown in FIG. 2B.

Accordingly, the light emitted from the light emitting parts S1 and S2 may irradiate the first light receiving part 500, and may not irradiate the second light receiving part 600. Thus, the diffusion angles θ1 and θ2 of the light emitted from the light emitting parts S1 and S2 may be greater than or equal to a tangent (a length of a lateral side of the light waveguide 100/a length of a longitudinal side of the light waveguide 100), and less than a 2 tangent (the length of the lateral side of the light waveguide 100/the length of the longitudinal side of the light waveguide 100).

For example, light emitted from the light emitting part S1 disposed at the first corner 110 of the light waveguide 100 is radiated between the third side surface 180 of the light waveguide 100 and a virtual diagonal line 151 connecting the first and third corners 110 and 130. In addition, light emitted from the light emitting part S2 disposed at the second corner 120 of the light waveguide 100 is radiated between the fourth side surface 190 of the light waveguide 100 and a virtual diagonal line 152 connecting the second and fourth corners 120 and 140.

A plurality of light receiving elements of the second light receiving part 600 is arranged in a line beside the second side surface 170. The light receiving elements may include a phototransistor.

The second light receiving part 600 receives light emitted from the light emitting parts S3 and S4 adjacent to the first side surface 160. Thus, a diffusion angle θ3 of the light emitting part S3 may be defined as a tangent (a length of a longitudinal side of the second side surface 170/a length of the longitudinal side of the fourth side surface 190) with respect to the fourth side surface 190, as shown in FIG. 2C. A diffusion angle θ4 of the light emitting part S4 may be defined as a tangent (the length of the longitudinal side of the second side surface 170/the length of the longitudinal side of the third side surface 180) with respect to the third side surface 180, as shown in FIG. 2D.

Accordingly, the light emitted from the light emitting parts S3 and S4 may irradiate the second light receiving part 600, and may not irradiate the first light receiving part 500. Thus, the diffusion angles θ3 and θ4 of the light emitted from the light emitting parts S3 and S4 may be greater than or equal to a tangent (the length of the lateral side of the light waveguide 100/the length of the longitudinal side of the light waveguide 100), and less than a 2 tangent (the length of the lateral side of the light waveguide 100/the length of the longitudinal side of the light waveguide 100).

For example, light emitted from the light emitting part S3 disposed at the third corner 130 of the light waveguide 100 is radiated between the fourth side surface 190 of the light waveguide 100 and the virtual diagonal line 151. In addition, light emitted from the light emitting part S4 disposed at the fourth corner 140 of the light waveguide 100 is radiated between the third side surface 180 of the light waveguide 100 and the virtual diagonal line 152.

The light waveguide 100 may be divided into four regions by the virtual diagonal lines 151 and 152.

As shown in FIG. 1, in the case of a touch in an, area [2, 3], when the light emitting part S2 and the light emitting part S3 emit light, the touch may be detected. In addition, in the case of a touch in an area [1, 2], when the light emitting part S1 and the light emitting part S2 emit light, the touch may be detected. In addition, in the case of a touch in an area [1, 4], when the light emitting part S1 and the light emitting part S4 emit light, the touch may be detected. In addition, in the case of a touch in an area [3, 4], when the light emitting part S3 and the light emitting part S4 emit light, the touch may be detected.

According to an exemplary embodiment, the first and second light receiving parts 500 and 600 are respectively disposed along the first and second side surfaces 160 and 170 which are lateral sides of the light waveguide 100. Alternatively, the first and second light receiving parts 500 and 600 may be respectively disposed along the third and fourth side surfaces 180 and 190 which are longitudinal sides of the light waveguide 100. In addition, the touch position detecting apparatus 10 may further include a third light receiving part (not shown) and a fourth light receiving part (not shown) respectively disposed along the third and fourth side surfaces 180 and 190 of the light waveguide 100.

Light emitted from the light emitting parts S1, S2, S3 and S4 correspondingly reaches the first light receiving part 500 or the second light receiving part 600 according to the external touch. Light 311 not meeting an external obstacle, among the lights from the light emitting part S1 disposed at the first corner 110 is totally reflected at an inside of the light waveguide 100 to reach the first light receiving part 500, as shown in FIG. 3. In contrast, light 313 meeting the external obstacle, among the lights from the light emitting part S1 disposed at the first corner 110, may propagate out of the light waveguide 100 because the total reflection in the light waveguide 100 is frustrated.

The detecting part 700 detects an external touch position P based on an amount of the light received by the first and second light receiving parts 500 and 600. As shown in FIG. 4, the detecting part 700 includes an obtaining part 710 and a calculating part 730.

The obtaining part 710 obtains 2N y-axis coordinates from the amount of the received light, using an xy coordinate system having a y-axis substantially parallel with the longitudinal side of the first side surface 160 of the light waveguide 100 and an x-axis substantially parallel with the longitudinal side of the third side surface 180 of the light waveguide 100. In this case, 'N' is a positive integer. The y-axis coordinates may have the smallest amount of the received light in each light receiving range. The calculating part 730 calculates the 2N y-axis coordinates to detect N touch positions P.

The detecting part 700 may further include a matching part 750 matching the 2N y-axis coordinates based on light modulating intensity widths respectively corresponding to the 2N y-axis coordinates when N is greater than or equal to 2.

The matching part 750 includes a converting part 751, an arranging part 753 and an output part 755. The converting part 751 converts the light modulating intensity widths respectively corresponding to the 2N y-axis coordinates into digital values. The arranging part 753 arranges the 2N y-axis coordinates according to a light receiving time of the light receiving parts and sizes of the light modulating intensity widths which are converted into the digital values. The output part 755 cross-matches the arranged y-axis coordinates to output N coordinates to the calculating part 730.

An approach for detecting the touch position P, through which the detecting part 700 detects the touch position P, will be described in detail below.

Figure 5A:
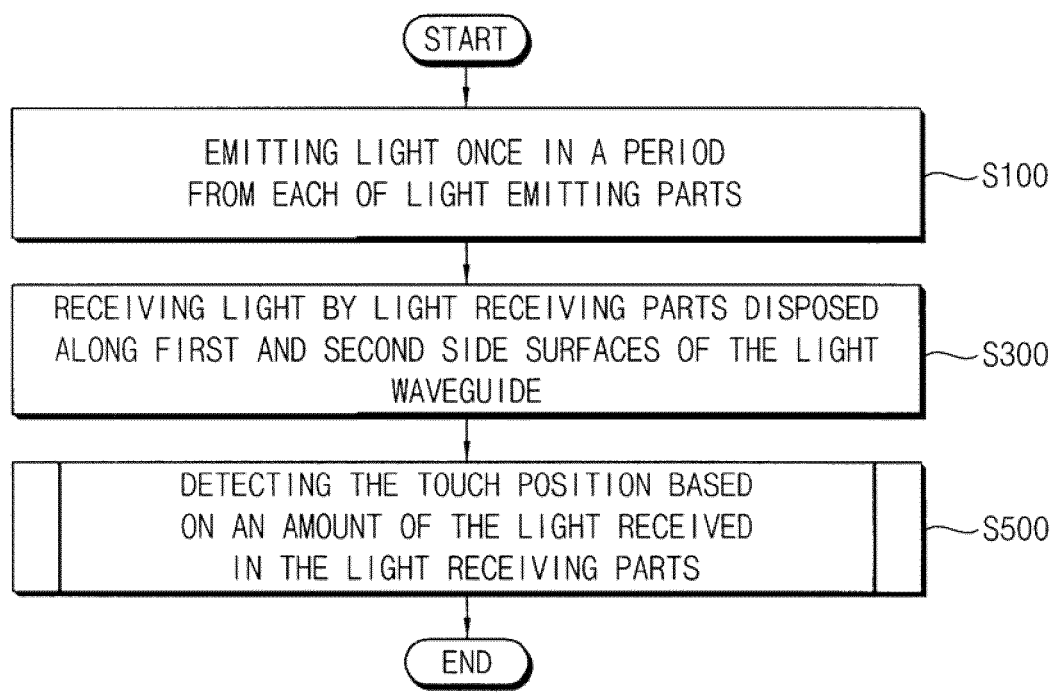
FIGS. 5A and 5B are flow charts illustrating a method of detecting a touch position performed by the touch position detecting apparatus of FIG. 1.
Figure 5B:
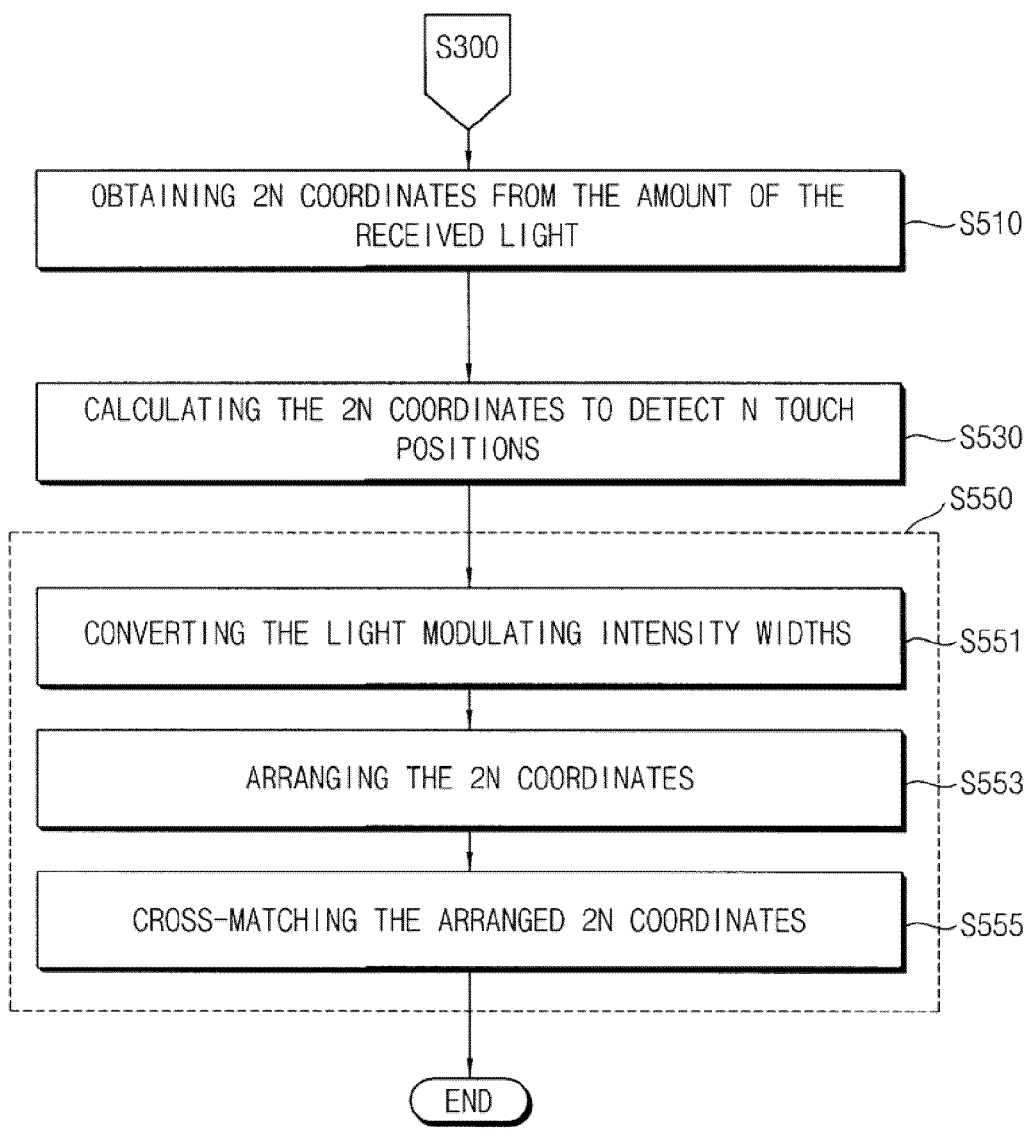

FIGS. 5A and 5B are flow charts illustrating a method of detecting a touch position performed by the touch position detecting apparatus of FIG. 1;

Referring to FIGS. 1 to 5B, in the method of detecting the touch position performed by the touch position detecting apparatus 10, each of the light emitting parts S1, S2, S3 and S4 is respectively disposed at each of the corners 110, 120, 130 and 140 of the light waveguide 100 having a rectangular shape and emits light once in the period (step S100).

Each of the light emitting parts S1, S2, S3 and S4 may emit light once in a period. For example, the light emitting parts S1, S2, S3 and S4 would not emit light at the same time. Each of the light emitting parts S1, S2, S3 and S4 may emit light at different times or alternatively, they may each continuously emit light. The period is defined as a time in which all of the light emitting parts S1, S2, S3 and S4 emit light once. The light emitting parts S1, S2, S3 and S4 may emit light sequentially, in any pattern, or randomly. For example, the light emitting parts S1, S2, S3 and S4 may emit light sequentially either clockwise or counterclockwise.

The light emitted from the light emitting parts S1, S2, S3 and S4 is respectively incident to the corners 110, 120, 130 and 140 of the light waveguide 100. The incident light is totally reflected at an inside of the light waveguide 100. The total reflection in the light waveguide 100 may be frustrated by making contact with an external obstacle in accordance with the physical phenomenon of frustrated total internal reflection (FTIR), as described above. The external obstacle may include a finger or a pointing device such as a touch pen or stylus.

The first light receiving part 500 disposed along the first side surface 160 of the light waveguide 100 and the second light receiving part 600 disposed along the second side surface 170 of the light waveguide 100 receive light according to the touch on the light waveguide 100 (step S300).

The first light receiving part 500 receives light emitted from the light emitting parts S1 and S2 adjacent to the second side surface 170, and the second light receiving part 600 receives light emitted from the light emitting parts S3 and S4 adjacent to the first side surface 160.

The detecting part 700 detects the external touch position P based on the amount of light received by the first and second light receiving parts 500 and 600 (step S500).

The obtaining part 710 obtains the 2N y-axis coordinates from the amount of the light received by the first and second light receiving parts 500 and 600, using the xy coordinate system having the y-axis substantially parallel with the longitudinal side of the first side surface 160 of the light waveguide 100 and the x-axis substantially parallel with the longitudinal side of the third side surface 180 of the light waveguide 100 (step S510). In this case, 'N' is a positive integer. The y-axis coordinates may have the smallest amount of the received light in each light receiving range.

The calculating part 730 calculates the 2N y-axis coordinates to detect N touch positions P (step S530). In addition, the touch position P may be detected using a position which is symmetric to the touch position P with respect to a center 150 of the light waveguide 100.

The matching part 750 may match the 2N y-axis coordinates based on the light modulating intensity widths respectively corresponding to the 2N y-axis coordinates (step S550), when N is greater than or equal to 2 and the touch position P is detected (step S500).

The converting part 751 converts the light modulating intensity widths respectively corresponding to the 2N y-axis coordinates into the digital values (step S551). The arranging part 753 arranges the 2N y-axis coordinates according to the light receiving time of the first and second light receiving parts 500 and 600 and sizes of the light modulating intensity widths which are converted into the digital values (step S553).

An arranging rule of the 2N y-axis coordinates is as follows. The y-axis coordinates y11, y12, y41 and y42 are arranged in a plurality of columns. Each of the columns includes the y-axis coordinates obtained from the first and second light receiving parts 500 and 600 at the same time. Among the y-axis coordinates obtained at the same time, for example, among the y-axis coordinates in one column, the y-axis coordinate having a bigger size of the light modulating intensity width is disposed higher and the y-axis coordinate having a smaller size of the light modulating intensity width is disposed lower.

For example, the y-axis coordinates obtained from each of the light emitting parts S1, S2, S3 and S4 are arranged in a column, and total four columns may be arranged corresponding to the light emitting parts S1, S2, S3 and S4 because the light emitting parts S1, S2, S3 and S4 emit light at a different time.

The output part 755 cross-matches the arranged y-axis coordinates to deduct N coordinates (step S555). The touch position P may be detected by substituting the deducted coordinates in the following Equations 3, 4, 7 to 10.

Figure 6A:
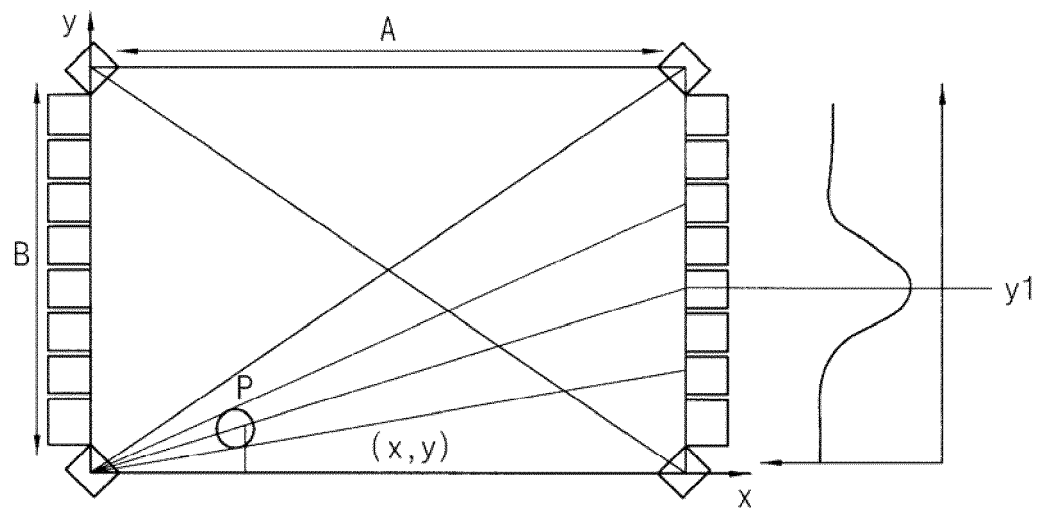
FIGS. 6A and 6B are conceptual diagrams illustrating an algorithm for detecting a touch position of a single touch occurring in an area [1, 4] of a light waveguide in FIG. 1.
Figure 6B:
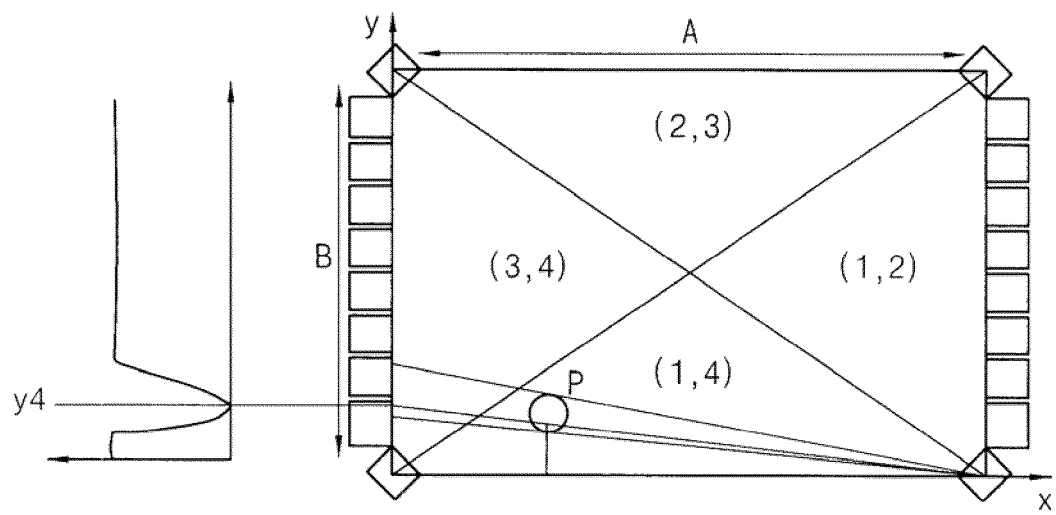
Figure 7A:
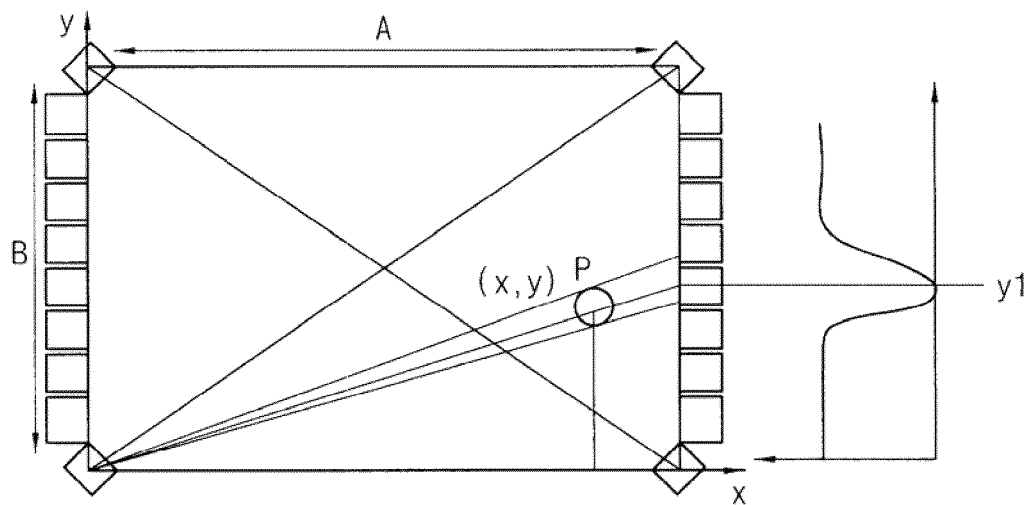
FIGS. 7A and 7B are conceptual diagrams illustrating an algorithm for detecting a touch position of a single touch occurring in an area [1, 2] of the light waveguide in FIG. 1.
Figure 7B:
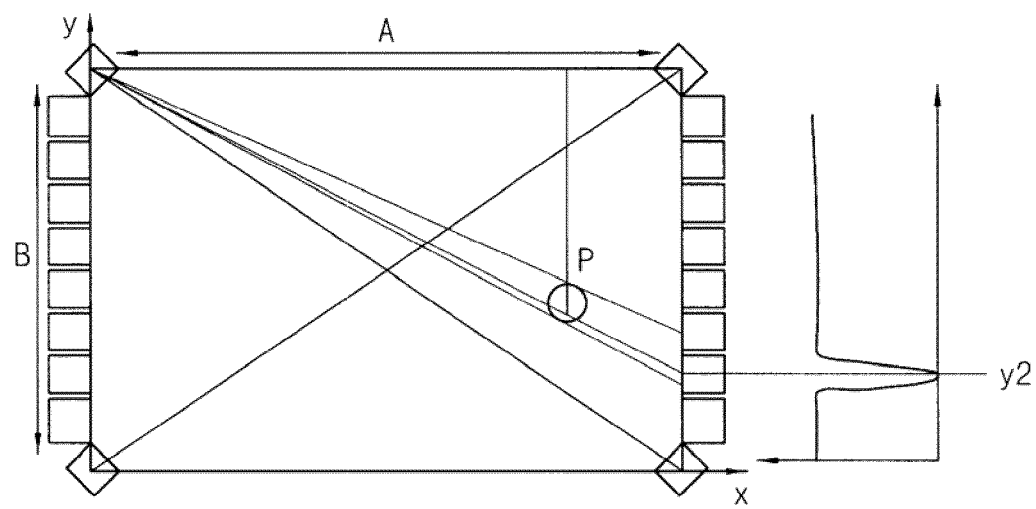

FIGS. 6A and 6B are conceptual diagrams illustrating an algorithm for detecting a touch position of a single touch occurring in an area [1, 4] of a light waveguide in FIG. 1. FIGS. 7A and 7B are conceptual diagrams illustrating an algorithm for detecting a touch position of a single touch occurring in an area [1, 2] of the light waveguide in FIG. 1.

For example, the light emitting parts S1, S2, S3 and S4 may sequentially emit light clockwise. The light emitting part S1 disposed at the first corner 110 of the light waveguide 100 may represent an original point, a longitudinal side of the third side surface 180 corresponding to a surface of the light waveguide 100 may represent an x-axis, and a longitudinal side of the second side surface 170 corresponding to the surface of the light waveguide 100 may represent a y-axis. Longitudinal sides of the first and second side surfaces 160 and 170 are defined as lateral sides of the light waveguide 100. In this case, a length of each of the lateral sides is B. In addition, longitudinal sides of the third and fourth side surfaces 180 and 190 are defined as longitudinal sides of the light waveguide 100. In this case, a length of each of the longitudinal sides is A.

Referring to FIGS. 6A and 6B, the algorithm detecting the touch position P is explained when a touch occurs in the area [1, 4]. An amount of the light reaching the first light receiving part 500 from the light emitting part S1 and an amount of the light reaching the second light receiving part 600 from the light emitting part S4 are changed when an external touch occurs.

In FIG. 6A, a minimum intensity point (MIP) y1 occurs during an emitting time of the emitting part S1 by the external touch. In this case, an amount of light of the first light receiving part 500 is minimal at the MIP y1.

A first right-angled triangle having a base of the third side surface 180 and an altitude of y is defined and a second right-angled triangle having a base of the third side surface 180 and an altitude of y1 is defined when the touch position P is defined as a coordinate (x, y) in an xy coordinate system. The first and second right-angled triangles are substantially similar in shape. Thus, a ratio of the base to the altitude may be defined by the following Equation 1.

$$x:y = A:y1 \qquad \text{Equation 1}$$

In FIG. 6B, an MIP y2 occurs during an emitting time of the emitting part S4 by the external touch. In this case, the amount of the light of the second light receiving part 600 is minimal at the MIP y2.

A third right-angled triangle having a base of the third side surface 180 and an altitude of y is defined and a fourth right-angled triangle having a base of the third side surface 180 and an altitude of y4 is defined. The third and fourth right-angled triangles are substantially similar in shape. Thus, a ratio of the base to the altitude may be defined by the following Equation 2.

$$A-x:y = A:y4 \qquad \text{Equation 2}$$

Equations 1 and 2 are respectively arranged according to x and y to get Equations 3 and 4.

$$x = A*y4/(y1+y4) \qquad \text{Equation 3}$$

$$y = y1*y4/(y1+y4) \qquad \text{Equation 4}$$

The variable 'x' of Equation 3 is an x-axis coordinate of the touch position P, and the variable 'y' of Equation 4 is a y-axis coordinate of the touch position P. Thus, the longitudinal side and the lateral side of the light waveguide 100 are known, and the altitude of y1 of the second right-angled triangle and the altitude of y4 of the fourth right-angled triangle may be obtained, for example, using the minimal light amounts in each light receiving range of the first and second light receiving parts 500 and 600 so that the x-axis coordinate and the y-axis coordinate of the touch position P may be calculated.

The minimal light amounts, in each light receiving range of the first and second light receiving parts 500 and 600, which are stored in the detecting part 700, may be substituted into Equations 3 and 4 to directly detect the touch position P.

Referring to FIGS. 7A and 7B, the algorithm detecting the touch position P is explained when a touch occurs in the area [1, 2]. An amount of the light reaching the first light receiving part 500 from the light emitting part S1 and an amount of the light reaching the first light receiving part 500 from the light emitting part S2 are changed when an external touch occur. The light emitting parts S1 and S2 emit light with a time difference or continuously emit light, thus, the first light receiving part 500 may detect a change in the light amounts emitted from the first and the second light receiving parts 500 and 600 with a time difference.

In FIG. 7A, the MIP y1 occurs during the emitting time of the emitting part S1 by the external touch. In this case, an amount of light of the first light receiving part 500 is minimal at the MIP y1.

A fifth right-angled triangle having a base of the third side surface 180 and an altitude of y is defined and a sixth right-angled triangle having a base of the third side surface 180 and the altitude of y1 is defined when the touch position P is defined as a coordinate (x, y) in the xy coordinate system. The fifth and sixth right-angled triangles are substantially similar in shape. Thus, a ratio of the base to the altitude may be defined by the following Equation 5.

$$x:y = A:y1 \qquad \text{Equation 5}$$

In FIG. 7B, an MIP y2 occurs during an emitting time of the emitting part S2 by the external touch. In this case, an amount of light of the first light receiving part 500 is minimal at the MIP y2.

A seventh right-angled triangle having a base of the fourth side surface 190 and an altitude of B−y is defined and an eighth right-angled triangle having a base of the fourth side surface 190 and an altitude of B−y2 is defined. The seventh and eighth right-angled triangles are substantially similar in shape. Thus, a ratio of the base to the altitude may be defined by the following Equation 6.

$$A-x:(B-y) = A:(B-y2) \qquad \text{Equation 6}$$

Equations 5 and 6 are respectively arranged according to x and y to get Equations 7 and 8.

$$x = A*B/(B+y1-y2) \qquad \text{Equation 7}$$

$$y = B*y1/(B+y1-y2) \qquad \text{Equation 8}$$

The variable 'x' of Equation 7 is an x-axis coordinate of the touch position P, and the variable 'y' of Equation 8 is a y-axis coordinate of the touch position P. Thus, the longitudinal side and the lateral side of the light waveguide 100 are known, and the altitude of y1 of the sixth right-angled triangle and the altitude of B−y2 of the eighth right-angled triangle may be obtained, using the minimal light amount in the light receiving range of the first light receiving part 500 during each emitting time of the light emitting parts S1 and S2 so that the x-axis coordinate and the y-axis coordinate of the touch position P may be calculated.

The minimal light amount, in the light receiving range of the first light receiving part 500, which is stored in the detecting part 700, may be substituted into Equations 7 and 8 to directly detect the touch position P.

The algorithm detecting the touch position P may be used when a touch occurs in the area [2, 3] or in the area [3, 4], as well. In addition, the touch position P may be detected using a position which is symmetric to the touch position P with respect to the center 150 of the light waveguide 100 when the touch occurs in the area [2, 3] of the light waveguide 100. Accordingly, a coordinate (x', y') in the area [1, 4] which is symmetric to the touch position P with respect to the center 150 of the light waveguide 100 may be calculated by Equations 3 and 4. The coordinate (x, y) of the touch position P may be calculated by Equations 9 and 10.

$$x = A - x' \qquad \text{Equation 9}$$

$$y = B - y' \qquad \text{Equation 10}$$

Similarly, the touch position P may be detected using a position which is symmetric to the touch position P with respect to the center 150 of the light waveguide 100 when the touch occurs in the area [3, 4] of the light waveguide 100. Accordingly, a coordinate (x', y') in the area [1, 2] which is symmetric to the touch position P with respect to the center 150 of the light waveguide 100 may be calculated by Equations 7 and 8. The coordinate (x, y) of the touch position P may be calculated by Equations 9 and 10.

Figure 8A:
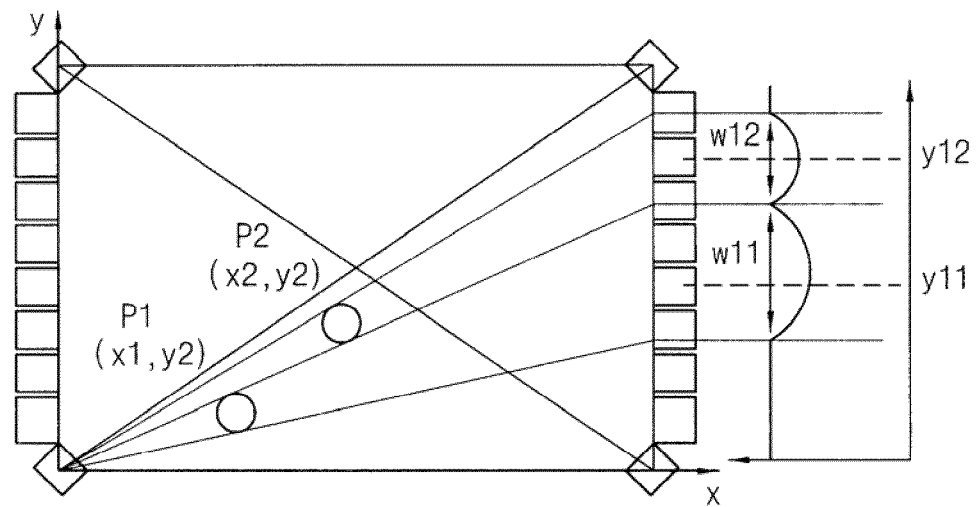
FIGS. 8A and 8B are conceptual diagrams illustrating an algorithm for detecting touch positions of two touches occurring in the area [1, 4] of the light waveguide in FIG. 1.
Figure 8B:
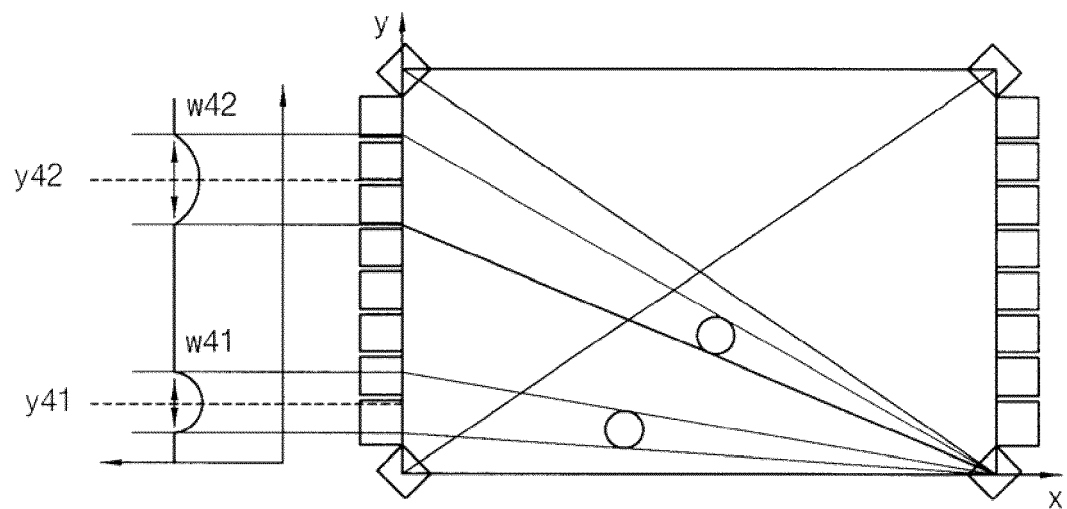

FIGS. 8A and 8B are conceptual diagrams illustrating an algorithm for detecting positions P1 and P2 of two touches occurring in the area [1, 4] of the light waveguide in FIG. 1.

For example, the light emitting parts S1, S2, S3 and S4 may sequentially emit light clockwise. The light emitting part S1 disposed on the first corner 110 of the light waveguide 100 may represent an original point, a longitudinal side of the third side surface 180 corresponding to a surface the light waveguide 100 may represent an x-axis, and a longitudinal side of the second side surface 170 corresponding to the surface the light waveguide 100 may represent a y-axis. Longitudinal sides of the first and second side surfaces 160 and 170 are defined as lateral sides of the light waveguide 100. In this case, a length of each of the lateral sides is B. In addition, longitudinal sides of the third and fourth side surfaces 180 and 190 are defined as longitudinal sides of the light waveguide 100. In this case, a length of each of the longitudinal sides is A.

Referring to FIGS. 8A and 8B, the algorithm detecting the touch positions P1 and P2 is explained when a touch occurs in the area [1, 4]. An amount of the light reaching the first light receiving part 500 from the light emitting part S1 and an amount of the light reaching the second light receiving part 600 from the light emitting part S4 are changed when an external touch occur. Hereinafter, in yab and wab, 'a' corresponds to the light emitting parts S1, S2, S3 and S4, and 'b' corresponds to the touch positions P1 and P2.

In FIG. 8A, MIPs y11 and y12 occur during the emitting time of the emitting part S1 by the external touch. In this case, an amount of light the first light receiving part 500 is minimal at the MIPs y11 and y12.

In FIG. 8B, MIPs y41 and y42 occur during the emitting time of the emitting part S4 by the external touch. In this case, an amount of light of the second light receiving part 600 is minimal at the MIPs y11 and y12.

The touch position P1 is defined as a coordinate (x1, y1), the touch position P2 is defined as a coordinate (x2, y2), and the y-axis coordinates y11, y12, y41 and y42 which are obtained from the minimal light amounts in each of the light receiving ranges of the first and second light receiving parts 500 and 600 are matched.

A matching of the y-axis coordinates y11, y12, y41 and y42 are performed using light modulating intensity widths respectively corresponding to the y-axis coordinates y11, y12, y41 and y42.

For example, the light modulating intensity widths respectively corresponding to the y-axis coordinates y11, y12, y41 and y42 are converted into digital values. The y-axis coordinates y11, y12, y41 and y42 according to a light receiving time of the first and second light receiving parts 500 and 600 and sizes of the light modulating intensity widths which are converted into the digital values, are arranged. The arranged y-axis coordinates y11, y12, y41 and y42 are cross-matched to output two coordinates.

An arranging rule of the y-axis coordinates y11, y12, y41 and y42 is the following. The y-axis coordinates y11, y12, y41 and y42 are arranged in a plurality of columns. Each of the columns includes the y-axis coordinates obtained from the first and second light receiving parts 500 and 600 at the same time. Among the y-axis coordinates obtained at the same time, for example, among the y-axis coordinates in one column, the y-axis coordinate having a bigger size of the light modulating intensity width is disposed higher and the y-axis coordinate having a smaller size of the light modulating intensity width is disposed lower.

For example, the y-axis coordinates obtained from each of the light emitting part S1, S2, S3 and S4 are arranged in a column, and total four columns may be arranged corresponding to the light emitting parts S1, S2, S3 and S4 because the light emitting parts S1, S2, S3 and S4 emit light at a different time.

According to the arranging rule, the y-axis coordinates y11, y12, y41 and y42 are grouped into a plurality of columns so that the columns are arranged in a horizontal direction in an order of obtaining time, and the y-axis coordinates in each of the columns are arranged in a vertical direction according to sizes of light modulating intensity widths w11, w12, w41 and w42 corresponding to the y-axis coordinates y11, y12, y41 and y42. Arranging relationships of the y-axis coordinates y11, y12, y41 and y42 are the following.

| y42 | y11 |
| y41 | y12 |

Accordingly, the arranged y-axis coordinates y11, y12, y41 and y42 are cross-matched to deduct two coordinates which are a y-axis coordinate (y41, y11) and a y-axis coordinate (y42, y12). Therefore, the y-axis coordinate (y41, y11) is substituted in Equations 3 and 4 to detect an xy coordinate (x1, y1) of the touch position (P1). Similarly, the y-axis coordinate (y42, y12) is substituted in Equations 3 and 4 to detect an xy coordinate (x2, y2) of the touch position (P2).

Figure 9A:
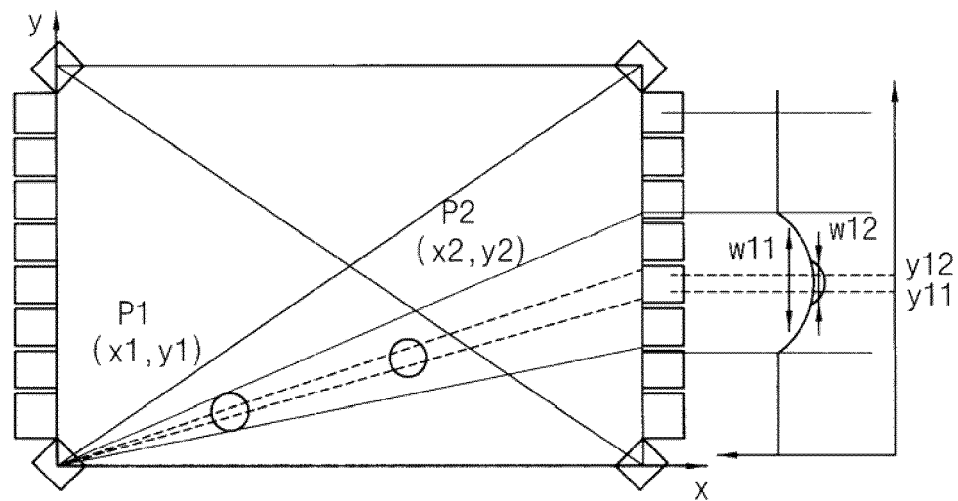
FIGS. 9A and 9B are conceptual diagrams illustrating an algorithm for detecting touch positions of two touches occurring in the area [1, 4] of the light waveguide in FIG. 1 when light receiving ranges of two touches overlap with each other.
Figure 9B:
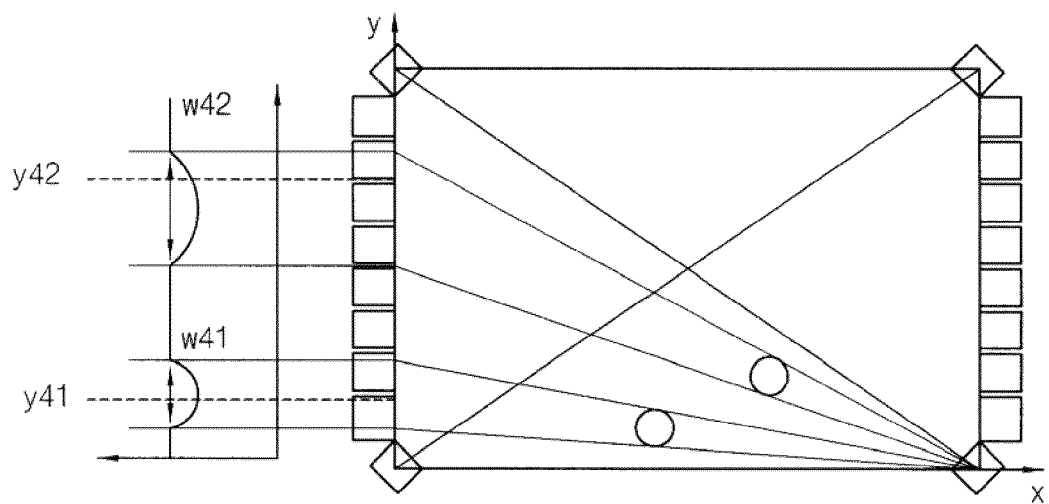
Figure 10A:
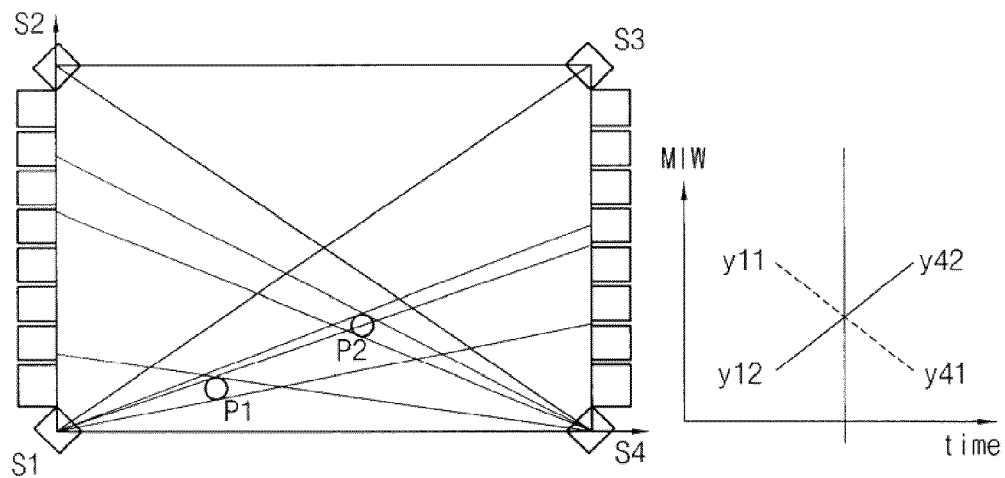
FIGS. 10A to 10H are conceptual diagrams illustrating a match of y-axis coordinates of touch positions when two touches occur on the light waveguide in FIG. 1.
Figure 10B:
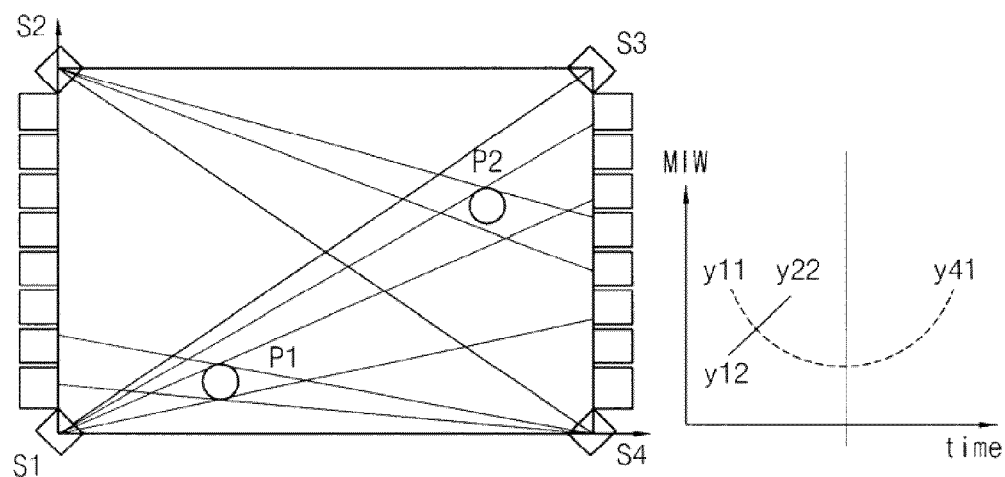
Figure 10C:
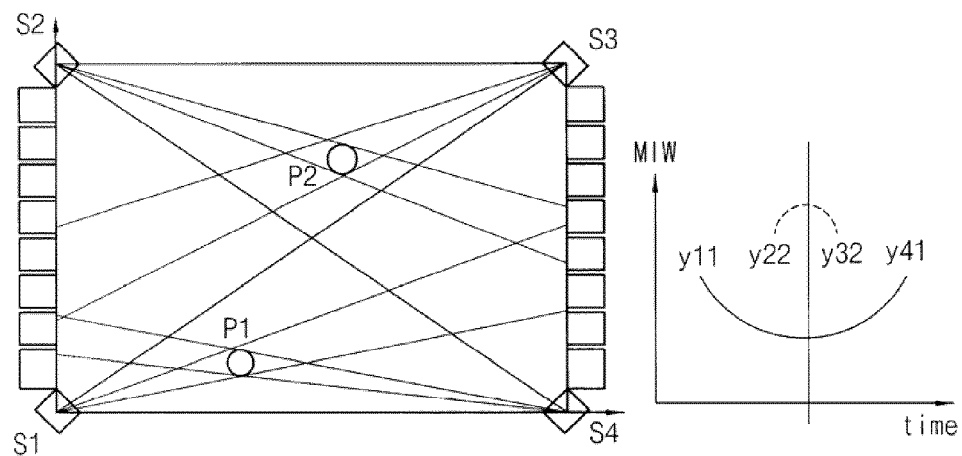
Figure 10D:
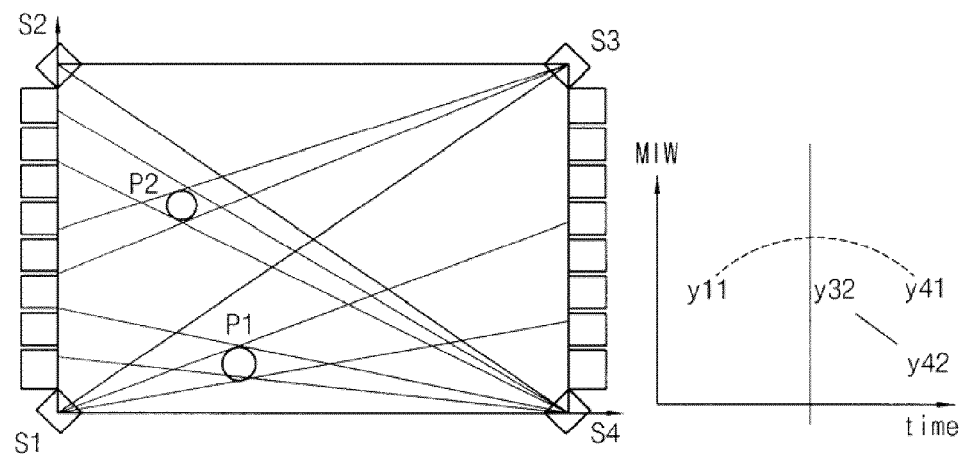
Figure 10E:
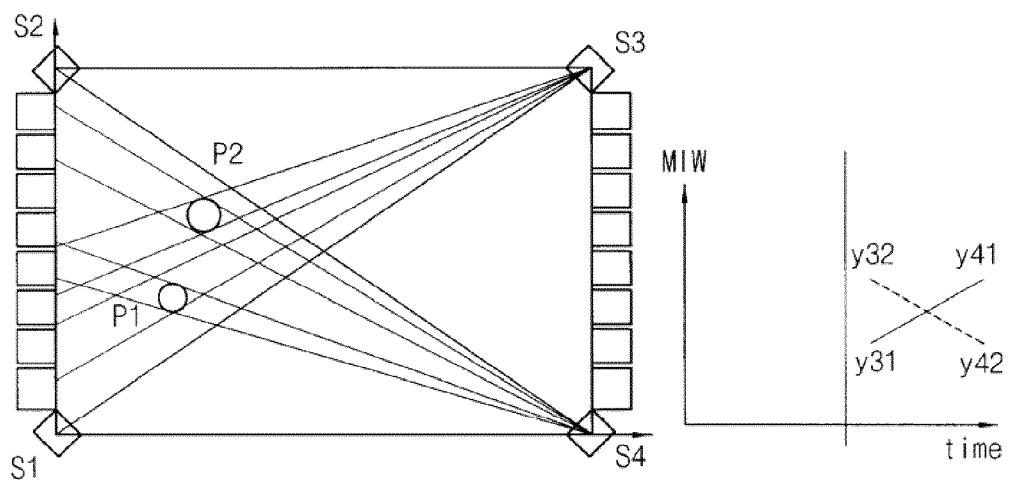
Figure 10F:
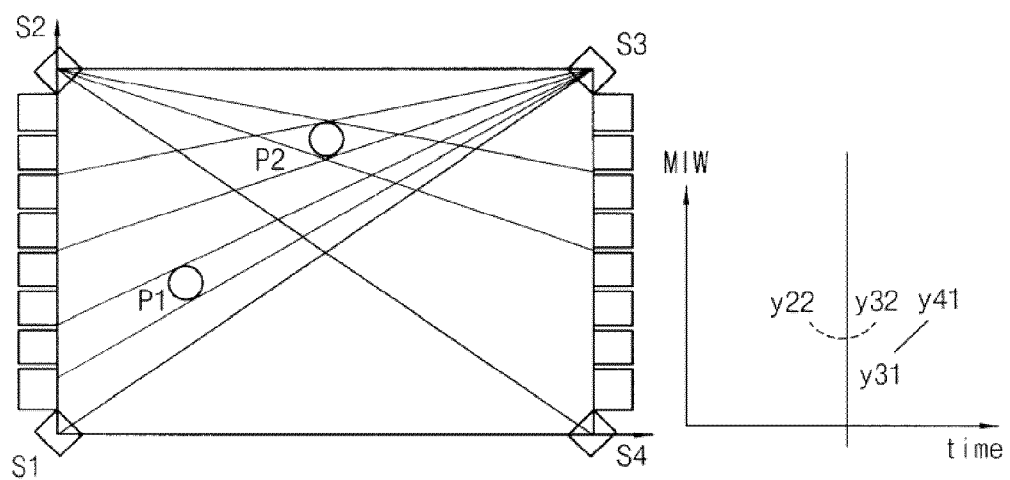
Figure 10G:
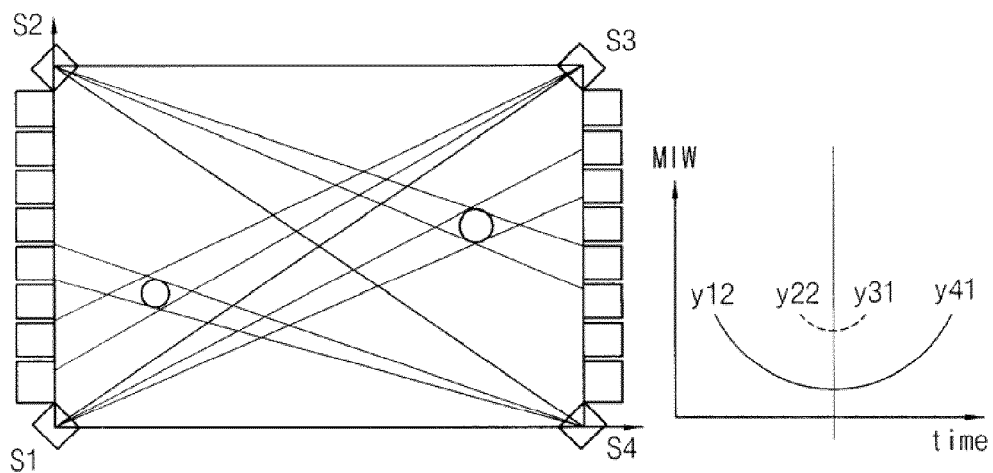
Figure 10H:
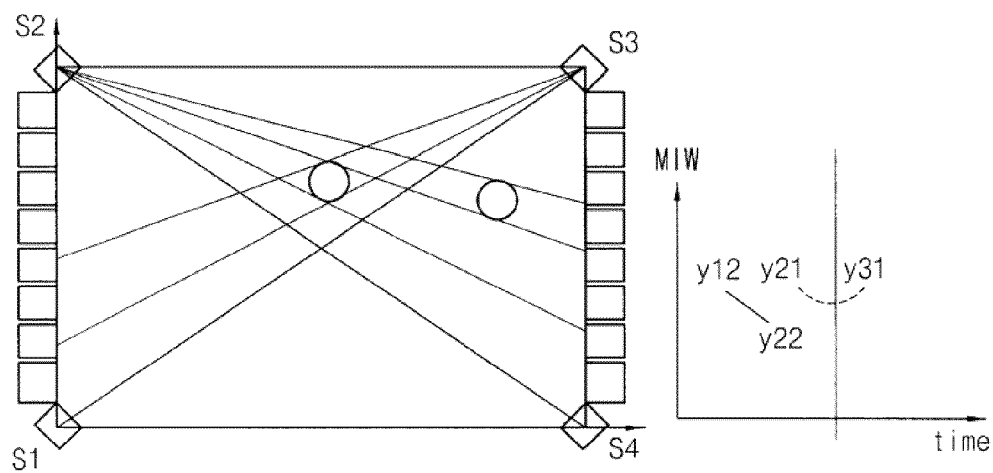

FIGS. 9A and 9B are conceptual diagrams illustrating an algorithm for detecting touch positions of two touches occurring in the area [1, 4] of the light waveguide in FIG. 1 when light receiving ranges of two touches overlap with each other.

Referring to FIGS. 9A and 9B, the light receiving ranges of the first and second light receiving parts 500 and 600 overlap with each other. As shown in FIGS. 9A and 9B, differences among the light modulating intensity widths w11, w12, w41 and w42 exist according to distances between the touch points P1 and P2 and the light emitting parts S1, S2, S3 and S4, even though the light receiving ranges of the first and second light receiving parts 500 and 600 overlap with each other. Therefore, the arranging may be possible according to the arranging rule.

FIGS. 10A to 10H are conceptual diagrams illustrating a match of y-axis coordinates of touch positions when two touches occur on the light waveguide in FIG. 1.

FIGS. 10A to 10H show number of cases of which the touch positions P1 and P2 are on each area of the light waveguide 100, and show matchings of the y-axis coordinates according to the cases when two touches occur. In addition, the touch positions P1 and P2 may be detected using positions which are symmetric to the touch positions P1 and P2 with respect to the center 150 of the light waveguide 100.

The y-axis coordinates are obtained from the light amounts of the first and second light receiving parts 500 and 600 during each light emitting time of each of the light emitting parts S1, S2, S3 and S4 disposed at each of the corners 110, 120, 130 and 140 of the light waveguide 100. The obtained y-axis coordinates are arranged through the arranging rule and cross-matched to deduct two coordinates. The touch positions P1 and P2 may be detected by substituting the deducted coordinates in the following Equations 3, 4, 7 to 10.

Figure 11:
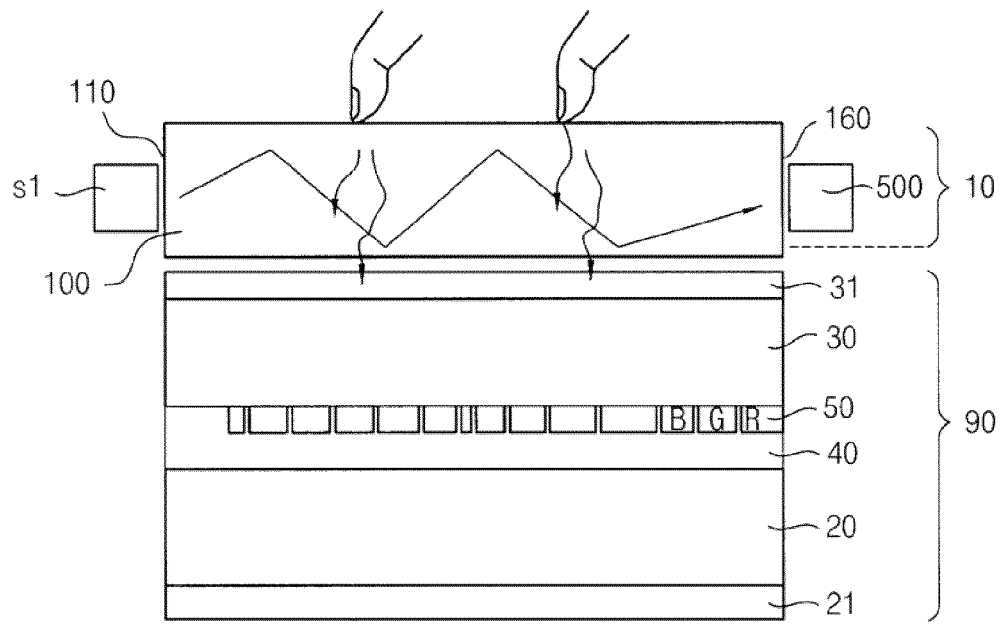
FIG. 11 is a cross-sectional view of a display apparatus including the touch position detecting apparatus of FIG. 1.

FIG. 11 is a cross-sectional view of a display apparatus including the touch position detecting apparatus of FIG. 1.

Referring to FIG. 11, a display apparatus 1 includes a touch position detecting apparatus 10 and a display panel 90.

The touch position detecting apparatus 10 is disposed over the display panel 90. The touch position detecting apparatus 10 includes a light waveguide 100, light emitting parts S1, S2, S3 and S4, a first light receiving part 500, a second light receiving part 600 and a detecting part 700. The touch position detecting apparatus 10 according an exemplary embodiment is substantially the same as the touch position detecting apparatus 10 in FIG. 1 so that any repetitive explanation concerning the above elements may be omitted. A method of detecting the touch position performed by the touch position detecting apparatus 10 according to an exemplary embodiment may be substantially the same as the method illustrated in FIGS. 5A and 5B so that any repetitive explanation concerning the above elements may be omitted.

The touch position detecting apparatus 10 detects a touch position P to provide an information on the touch position P to the display panel 90 when an external touch occurs. The detecting part 700 is connected to a time controller of the display panel 90 to provide the information on the touch position P to the display panel 90.

The display panel 90 is disposed under the light waveguide 100 to display an image through the light waveguide 100. The display panel 90 displays an image according to the touch position P provided from the touch position detecting apparatus 10.

The display panel 90 includes a lower substrate 20, an upper substrate 30 facing the lower substrate 20 and a liquid crystal layer 40 formed between the lower and upper substrates 20 and 30. The display panel 90 may further include a polarizing plate 21 disposed under the lower substrate 20 and a polarizing plate 31 disposed over the upper substrate 30.

The lower substrate 20 may include a plurality of data lines, a plurality of gate lines crossing the data lines, pixel areas defined by the data lines and gate lines, and thin-film transistors (TFTs) formed on the pixel areas. The TFTs provide image signals from the data lines to the pixel areas in response to gate signals provided from the gate lines.

The upper substrate 30 includes a color filter 50. A common electrode, a black matrix, and other display panel elements, may be formed on the upper substrate 30. In the present exemplary embodiment, the color filter 50 and the common electrode are formed on the upper substrate 30. Alternatively, the color filter 50 and the common electrode may be formed on the lower substrate 20.

The display apparatus 1 according to the present exemplary embodiment includes a light waveguide 100 which is transparent, separated from the upper substrate 30 and disposed over the display panel 90. Thus, the light waveguide 100 protects the display panel 90 so that the display apparatus 1 may be used as an outdoor display apparatus.

Figure 12:
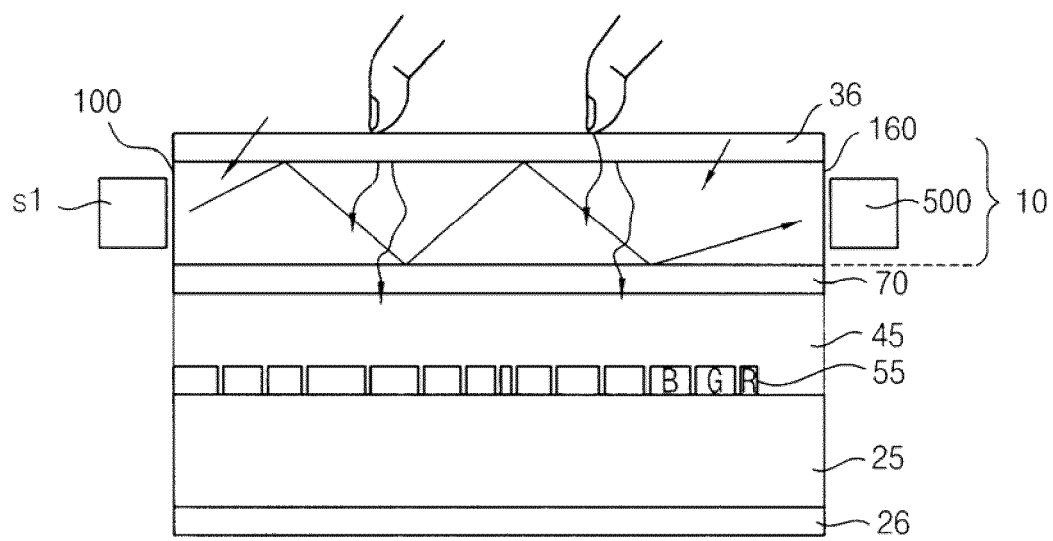
FIG. 12 is a cross-sectional view of a display apparatus according to an exemplary embodiment of the present invention.

FIG. 12 is a cross-sectional view of a display apparatus according to an exemplary embodiment of the present invention.

Referring to FIG. 12, a display apparatus 5 includes a touch position detecting apparatus 10, a lower substrate 25 and a liquid crystal layer 45 formed between the touch position detecting apparatus 10 and the lower substrate 25.

The touch position detecting apparatus 10 includes a light waveguide 100, light emitting parts S1, S2, S3 and S4, a first light receiving part 500, a second light receiving part 600 and a detecting part 700. The touch position detecting apparatus 10 according to the present exemplary embodiment is substantially the same as the touch position detecting apparatus 10 in FIG. 1 so that any repetitive explanation concerning the above elements may be omitted. A method of detecting the touch position performed by the touch position detecting apparatus 10 according to an exemplary embodiment is substantially the same as the method illustrated in FIGS. 5A and 5B so that any repetitive explanation concerning the above elements may be omitted.

The touch position detecting apparatus 10 detects a touch position P to provide information on the touch position P to the lower substrate 25 when an external touch occurs. The detecting part 700 is connected to a time controller of the lower substrate 25 to provide the information on the touch position P to the lower substrate 25.

The light waveguide 100 of the touch position detecting apparatus 10 may be used as an upper substrate in the display apparatus 5. The display apparatus 5 may further include a polarizing plate 26 disposed under the lower substrate 25 and a polarizing plate 36 disposed over the light waveguide 100.

The lower substrate 25 includes a color filter 55. The lower substrate 25 may include a plurality of data lines, a plurality of gate lines crossing the data lines, pixel areas defined by the data lines and gate lines, and thin-film transistors TFTs formed on the pixel areas. The TFTs provide image signals provided from the data lines to the pixel areas in response to gate signals provided from the gate lines.

The display apparatus 5 may further include a low refraction layer 70 between the liquid crystal layer 45 and the light waveguide 100. The low refraction layer 70 blocks light 311 not meeting an external obstacle among the lights from the light emitting parts S1, S2, S3 and S4 so that the light 311 is not emitted to the liquid crystal layer 45. For example, a refraction index of the light waveguide 100 is about 1.5, and a refraction index of the low refraction layer 70 is less than or equal to about 1.2, or greater than about 1.

The light waveguide 100 of the touch position detecting apparatus 10 may be used as an upper substrate in the display apparatus 5 according to an exemplary embodiment. Thus, a thickness of the display apparatus 5 may decrease so that the display apparatus 5 may be used as an outdoor display apparatus or an indoor display apparatus.

As described above, a touch position detecting apparatus according to an exemplary embodiment of the present invention includes light emitting parts disposed at corners of a light waveguide so that the number of light sources may decrease. Thus, a manufacturing cost may decrease. In addition, multi-touch positions may be detected accurately without errors.

The foregoing is illustrative of the present invention and is not to be construed as limiting thereof. Although exemplary embodiments of the present invention have been described, those skilled in the art will readily appreciate that many modifications are possible in the exemplary embodiments without materially departing from the present invention.

What is claimed is:

1. A method of detecting a touch position on a touch-sensitive panel, the method comprising:
    emitting light from each of a plurality of light emitting parts respectively disposed exclusively at four corners of a light waveguide having a rectangular plate shape, wherein each of the plurality of light emitting parts emits light once in a period;
    receiving a quantity of light by light receiving parts disposed along first and second side surfaces of the light waveguide, the second side surface facing the first side surface, wherein the quantity of light received depends upon the presence of a touch; and
    detecting a position of the touch based on the quantity of the light received in the light receiving parts.

2. The method of claim 1, wherein the light receiving part disposed along the first side surface of the light waveguide receives the light emitted from the light emitting parts adjacent to the second side surface of the light waveguide, and the light receiving part disposed along the second side surface of the light waveguide receives the light emitted from the light emitting parts adjacent to the first side surface of the light waveguide.

3. The method of claim 1, wherein the light emitting parts are driven to emit light in sequence.

4. A method of detecting a touch position on a touch-sensitive panel, the method comprising:
    emitting light from each of a plurality of light emitting parts respectively disposed at corners of a light waveguide having a rectangular plate shape, wherein each of the plurality of light emitting parts emits light once in a period;
    receiving a quantity of light by light receiving parts disposed along first and second side surfaces of the light waveguide, the second side surface facing the first side surface, wherein the quantity of light received depends upon the presence of a touch; and
    detecting a position of the touch based on the quantity of the light received in the light receiving parts, wherein detecting the touch position comprises:
    obtaining 2N coordinates from the quantity of the received light within a coordinate system having a first axis substantially parallel with a longitudinal side of the first side surface of the light waveguide and a second axis substantially parallel with a longitudinal side of a third side surface of the light waveguide, the third side surface being substantially perpendicular to the first side surface; and
    calculating the 2N coordinates to detect N touch positions, wherein N is a positive integer.

5. The method of claim 4, wherein detecting the touch position further comprises detecting the touch position using a position which is symmetric to the touch position with respect to a center of the light waveguide.

6. The method of claim 4, wherein coordinates having the smallest quantity of the received light in each light receiving range are obtained when the 2N coordinates are obtained from the quantity of the received light.

7. The method of claim 4, wherein detecting the touch position further comprises: matching the 2N coordinates based on light modulating intensity widths respectively corresponding to the 2N coordinates when N is greater than or equal to 2.

8. The method of claim 7, wherein matching the 2N coordinates comprises:

converting the light modulating intensity widths respectively corresponding to the 2N coordinates into digital values;
arranging the 2N coordinates according to light receiving time of the light receiving parts and sizes of the light modulating intensity widths which are converted into the digital values; and
cross-matching the arranged 2N coordinates to output N coordinates.

9. A touch position detecting apparatus comprising:
a light waveguide having a rectangular plate shape and having an index of refraction greater than an index of refraction of air;
a plurality of light emitting parts respectively disposed exclusively at four corners of the light waveguide, wherein each of the plurality of light emitting parts emits light once in a period;
a first light receiving part disposed along a first side surface of the light waveguide, and receiving a quantity of light emitted from the light emitting parts adjacent to a second side surface of the light waveguide wherein the quantity of light received depends upon the presence of a touch, the second side surface facing the first side surface;
a second light receiving part disposed along the second side surface of the light waveguide, and receiving a quantity light emitted from the light emitting parts adjacent to the first side surface of the light waveguide, wherein the quantity of light received depends upon the presence of a touch; and
a detecting part detecting a position of the touch based on the quantity of the light received by the first and second light receiving parts.

10. The touch position detecting apparatus of claim 9, wherein the light emitting parts are driven to emit light in sequence.

11. The touch position detecting apparatus of claim 9, wherein the corners of the light waveguide are chamfered to create the light emitting parts.

12. The touch position detecting apparatus of claim 9, wherein each of the light emitting parts comprises an infrared light emitting diode (LED).

13. A touch position detecting apparatus comprising:
a light waveguide having a rectangular plate shape and having an index of refraction greater than an index of refraction of air;
a plurality of light emitting parts respectively disposed at corners of the light waveguide, wherein each of the plurality of light emitting parts emits light once in a period;
a first light receiving part disposed along a first side surface of the light waveguide, and receiving a quantity of light emitted from the light emitting parts adjacent to a second side surface of the light waveguide wherein the quantity of light received depends upon the presence of a touch, the second side surface facing the first side surface;
a second light receiving part disposed along the second side surface of the light waveguide, and receiving a quantity light emitted from the light emitting parts adjacent to the first side surface of the light waveguide, wherein the quantity of light received depends upon the presence of a touch; and
a detecting part detecting a position of the touch based on the quantity of the light received by the first and second light receiving parts, wherein the detecting part comprises:
an obtaining part obtaining 2N coordinates from the quantity of the received light, within a coordinate system having a first axis substantially parallel with a longitudinal side of the first side surface of the light waveguide and a second axis substantially parallel with a longitudinal side of a third side surface of the light waveguide, the third side surface being substantially perpendicular to the first side surface; and
a calculating part calculating the 2N coordinates to detect N touch positions, wherein N is a positive integer.

14. The touch position detecting apparatus of claim 13, wherein each of the 2N coordinates is coordinates having the smallest quantity of the received light in each light receiving range.

15. The touch position detecting apparatus of claim 13, wherein the detecting part further comprises a matching part matching the 2N coordinates based on light modulating intensity widths respectively corresponding to the 2N coordinates when N is greater than or equal to 2.

16. The touch position detecting apparatus of claim 15, wherein the matching part comprises:
a converting part converting the light modulating intensity widths respectively corresponding to the 2N coordinates into digital values;
an arranging part arranging the 2N coordinates according to light receiving time of the light receiving parts and sizes of the light modulating intensity widths which are converted into the digital values; and
an outputting part cross-matching the arranged 2N coordinates to output N coordinates.

17. A display apparatus comprising:
a light waveguide having a rectangular plate shape and having an index of refraction greater than an index of refraction of air;
a plurality of light emitting parts respectively disposed exclusively at four corners of the light waveguide, wherein each of the plurality of light emitting parts emits light once in a period;
a first light receiving part disposed along a first side surface of the light waveguide, and receiving a quantity of light emitted from the light emitting parts adjacent to a second side surface of the light waveguide wherein the quantity of light received depends upon the presence of a touch, the second side surface facing the first side surface;
a second light receiving part disposed along the second side surface of the light waveguide, and receiving a quantity of light emitted from the light emitting parts adjacent to the first side surface of the light waveguide, wherein the quantity of light received depends upon the presence of a touch;
a detecting part detecting a position of the touch based on the quantity of light received by the first and second light receiving parts;
a thin-film transistor (TFT) substrate disposed under the light waveguide to receive an image signal according to the touch position; and
a liquid crystal layer formed between the light waveguide and the TFT substrate.

18. The display apparatus of claim 17, wherein the corners of the light waveguide are chamfered to create the light emitting parts.

19. A display apparatus comprising:
a light waveguide having a rectangular plate shape and having an index of refraction greater than an index of refraction of air;
a plurality of light emitting parts respectively disposed at corners of the light waveguide, wherein each of the plurality of light emitting parts emits light once in a period;

a first light receiving part disposed along a first side surface of the light waveguide, and receiving a quantity of light emitted from the light emitting parts adjacent to a second side surface of the light waveguide wherein the quantity of light received depends upon the presence of a touch, the second side surface facing the first side surface;

a second light receiving part disposed along the second side surface of the light waveguide, and receiving quantity of light emitted from the light emitting parts adjacent to the first side surface of the light waveguide, wherein the quantity of light received depends upon the presence of a touch;

a detecting part detecting a position of the touch based on the quantity of light received by the first and second light receiving parts;

a thin-film transistor (TFT) substrate disposed under the light waveguide to receive an image signal according to the touch position;

a liquid crystal layer formed between the light waveguide and the TFT substrate, a color filter disposed over the TFT substrate;

a low refraction layer disposed between the liquid crystal layer and a first surface of the light waveguide; and a polarizing plate disposed on a second surface of the light waveguide facing the first substrate.

20. A display apparatus comprising:

a light waveguide having a rectangular plate shape and having an index of refraction greater than an index of refraction of air;

a plurality of light emitting parts respectively disposed at corners of the light waveguide, wherein each of the plurality of light emitting parts emits light once in a period;

a first light receiving part disposed along a first side surface of the light waveguide, and receiving a quantity of light emitted from the light emitting parts adjacent to a second side surface of the light waveguide wherein the quantity of light received depends upon the presence of a touch, the second side surface facing the first side surface;

a second light receiving part disposed along the second side surface of the light waveguide, and receiving a quantity of light emitted from the light emitting parts adjacent to the first side surface of the light waveguide, wherein the quantity of light received depends upon the presence of a touch;

a detecting part detecting a position of the touch based on the quantity of light received by the first and second light receiving parts;

a thin-film transistor (TFT) substrate disposed under the light waveguide to receive an image signal according to the touch position;

a liquid crystal layer formed between the light waveguide and the TFT substrate, a color filter substrate disposed between the light waveguide and the liquid crystal layer; and a polarizing plat disposed between the light waveguide and the color filter substrate.

* * * * *